1

3,466,271
ALPHA PINENE POLYMERS AND THEIR PREPARATION
Anargiros P. Patellis, Belle Vernon, and Hans L. Nufer, Whitehall, Pa., assignors to Pennsylvania Industrial Chemical Corporation, Clairton, Pa., a corporation of Pennsylvania
No Drawing. Filed Nov. 8, 1966, Ser. No. 592,723
Int. Cl. C08f 5/00, 1/76, 1/72
U.S. Cl. 260—93.3        7 Claims

ABSTRACT OF THE DISCLOSURE

Polymerization of alpha pinene using as catalyst aluminum chloride and a lower alkyl tertiary amine and optionally an amine hydrochloride.

---

This invention relates to the polymerization of alpha pinene.

Beta pinene resins have been made and used on a very large scale for many years because they possess a combination of desirable properties. For example, they exhibit high solubility in hydrocarbon solvents such as are used in the manufacture of paints, adhesives, and varnishes, they are compatible with a wide variety of waxes, oils, bituminous materials and other resinous substances such as rosin, ester gums, coumarone-indene resins, and various others. A particularly advantageous property of beta pinene resins is that of relatively high softening point, for instance 125° to 135° C. (ring and ball). Also, they can be produced of color range from 2 to 5 on the Gardner scale.

Beta pinene is produced by the distillation of turpentine, the chief ingredient of which is alpha pinene. Despite the fact that it is a structural isomer of beta pinene, alpha pinene has no particular utility as a monomer for commercial resin production. In consequence, large quantities of alpha pinene of low commercial value have resulted from the demand for beta pinene resin.

Prior proposals for making alpha pinene resins resulted in products of, at most, about 80° C. softening point, and yields were so low as to be wholly uneconomical. As far as we are aware, no alpha pinene resin had been used prior to our invention.

It is among the objects of the present invention to provide a method of catalytically polymerizing alpha pinene to produce high yields of good color and of much higher melting point than were attained by previous attempts to polymerize this terpene, which is simple, easily practiced with standard equipment, makes use of commercially available and inexpensive catalytic materials, and does not require technically trained operators for its performance.

A further object is to provide alpha pinene polymers of at least 110° C. softening point, of relatively high molecular weight, and which possess solubility characteristics both similar to and also different from those of beta pinene polymers.

Other objects will appear hereinafter.

The invention is predicated upon our discovery that its stated objects are attained with co-catalysts composed of aluminum chloride and a lower alkyl tertiary amine. The amine will react with HCl of the aluminum chloride to form the amine hydrochloride. For best results, however, the catalyst should consist of all three constituents, i.e.;

$$AlCl_3/alk_3N \cdot HCl/alk_3N$$

where "alk" represents a lower alkyl radical.

In the preferred practice of the invention there is first prepared a solution of the co-catalyst in an inert solvent, and the alpha pinene is then added incrementally with vigorous stirring while maintaining the reaction body at from about 20° to 40° C. to insure maximum yield of resin of maximum softening point. After the alpha pinene has been added stirring and cooling (if needed) are continued for a period of time, at least 15 minutes, to bring the reaction to optimum completion, following which the catalyst is hydrolyzed with water with production of an oily phase and an aqueous phase. The alpha pinene polymer resin is then recovered by standard practices, as by steam distillation, from the oily phase.

As solvents, or diluents, aromatic hydrocarbons are preferred, e.g. xylene, diethyl benzenes, and Solvesso 100.

As an example of the preferred practice of the invention, a 500 ml. flask is purged with dry nitrogen and charged with 67 g. xylene, 12 g. $AlCl_3$, 1.2 g. triethylamine hydrochloride and 0.5 ml. triethylamine. Alpha pinene (100 g.) is added over a period of 45 min. at a temperature of 25° to 28° C. for 5 hours. On completion of the addition the reaction mass is maintained at about 28° C. for 5 hours. At the end of the hold period the batch is cooled to 0° C. and quenched with 200 ml. of water. After washing the resultant oily layer three times with equal quantities of water, the solvent and amine are removed by heating and blowing with nitrogen, or other inert gas, to a pot temperature of 190° C. The low molecular weight polymers are removed by distillation with dry steam between 210–220° C. to leave the desired alpha pinene resin. The resin obtained in this manner has a softening point of 115° C. and the yield is 69%.

As indicated above, triethylamine will also give improved resin yields over $AlCl_3$ alone owing to the formation of its salt from free HCl in the $AlCl_3$. Thus 8 g. $AlCl_3$ and 0.5 to 2 ml. of triethylamine gave yields of 56 to 67 percent and a resin of 105° to 108° C. softening point. These results are somewhat lower than those obtained with the ternary system just described but they still represent a significant and important improvement over aluminum chloride alone.

The alpha pinene should be of quite high purity; in fact the higher the purity the better the resin and the better the economy of the operation. Alpha pinene of 95 percent purity is commercially available and will give good results. A product of higher purity is preferably used. Alpha pinene commonly contains small amounts of camphene and beta pinene; the former does not interfere, while the latter is converted to resin of high softening point.

The invention is not restricted to the use of triethylamine, tributylamine, dimethylcyclohexylamine, N,N,N', lower alkyl triamines, examples being trimethyl, tripropylamine, tributylamine, dimethycyclohexylamine, N,N,N', N'-tetramethyldiaminomethane, and triethylenediamine.

In conjunction with a tertiary amine quaternary ammonium salts also improve polymer formation. Specifically benzyl trimethylammonium hydrochloride was successfully employed in the reaction to give a 61% yield of resin of 109° C. softening point.

The foregoing ternary co-catalyst example represents the preferred ratios of the three catalyst constituents. Increasing the catalyst proportions, for instance to 8 parts/ 1.50 parts/0.36 part results in only a slight increase in yield of resin. However, for the purposes of the invention satisfactory results are to be had using catalysts within the following ranges:

CATALYST RANGES (BASED ON ALPHA PINENE)

| | Parts by wt. | Moles |
|---|---|---|
| $AlCl_3$ | 3–6 | 0.225–0.451 |
| Triethylamine.HCl | 0.5–0.9 | 0.036–0.066 |
| Triethylamine | 0.1–0.25 | 0.01–0.025 |

In all amounts of these catalysts suffice, as indicated by the foregoing specific example.

The reaction temperature may range between 20° and 40° C. but preferably the range is 25° to 28° C. The temperatures below 20° C. retard polymer formation and temperatures above 40° C. result in a lowering of the resin molecular weight that is undesirable for many purposes. An increase in reaction time above 5 hours does not give a significant increase in yield but reducing this time normally results in lower yields and lower softening points.

An important and critical feature of the invention in the production of the high yields of high softening point resin which characterize the invention is to supply the reactants and the solvent in thoroughly dried condition, and in the case of alpha pinene to exclude its oxidation products from the reaction system during polymerization because alpha pinene is reactive with oxygen so that the presence of those products in other than extremely minute amounts results in decreased yields and lower softening point. According to our investigations the alpha pinene and the solvent used should contain a total of not more than 50 parts per million (p.p.m.) of water. Greater amounts of water result in decreased yields and resin of lower softening point.

Reduction of the water content of the alpha pinene and solvent is accomplished readily by drying them over molecular sieves, suitably Linde 5A, or with alkaline alumina. As a further precaution to avoid the objectionable effect of moisture, the reaction vessel and associated equipment should be well dried immediately prior to use, as by heating to, for example, 150° C.

Although the invention has been described with reference to batch process, those familiar with the art will understand that it is equally adaptable to continuous operation.

These polymers are soluble in all solvents for beta pinene polymers, such as hexane, benzene, heptane, toluene, xylene and mineral spirits. However, they differ from the beta pinene polymers in exhibiting solubility in methyl ethyl ketone, dioxane, ethyl acetate and cyclohexanol. They differ likewise in lower melt viscosity, and natural rubber requires less milling in making pressure-sensitive tapes.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of polymerizing alpha pinene comprising the steps of providing a catalyst composed of aluminum chloride and a lower alkyl tertiary amine in an inert solvent, adding alpha pinene thereto incrementally and with stirring while controlling the temperature in the liquid body to about 20° to 40° C. and continuing to do so for a period after the addition of the pinene to complete the polymerization, hydrolyzing the catalyst with production of an oily phase and an aqueous phase, washing the oily phase and then heating it to drive off the solvent, and then steam distilling the residue and recovering alpha pinene polymer of at least about 110° C. softening point (ring and ball).

2. A method according to claim 1, the catalyst including also a lower alkyl tertiary amine hydrochloride.

3. A method according to claim 2, said solvent being an aromatic hydrocarbon.

4. A method according to claim 2, the pinene being at least 95 percent pure, and being in dried condition.

5. A method according to claim 2, the temperature of the reaction of body being 25° to 28° C.

6. A method according to claim 2, the solvent being driven off in a current of inert gas at a temperature up to 190° C. and the residue steam distilled at 210° to 220° C.

7. A method according to claim 2, the catalyst being (1) aluminum chloride, (2) triethyl amine hydrochloride and (3) triethyl amine in proportions, by weight per 100 parts of alpha pinene, of 3 to 6 parts of (1), 0.5 to 0.9 part of (2), and 0.1 to 0.25 part of (3).

References Cited

UNITED STATES PATENTS

| | | | |
|---|---|---|---|
| 3,313,865 | 4/1967 | Vohwinkel | 260—878 |
| 3,354,132 | 11/1967 | Sproat | 260—88.2 |
| 3,401,136 | 9/1968 | Sellers | 260—29.8 |
| 3,415,798 | 12/1968 | Sellers et al. | 260—93.3 |

JOSEPH L. SCHOFER, Primary Examiner

R. A. GAITHER, Assistant Examiner